Patented Nov. 2, 1948

2,452,791

UNITED STATES PATENT OFFICE 2,452,791

FLUOROHYDRACRYLIC ACIDS AND THEIR ESTERS

Maynard S. Raasch, Wilmington, Del., assignor to E. I. du Pont de Nemours & Company, Wilmington, Del., a corporation of Delaware No Drawing. Application March 4, 1946,
Serial No. 651,967

6 Claims. (Cl. 260—484)

This invention relates to new fluorine-containing acids and more particularly to new fluorohydracrylic acids and their esters and methods for their preparation.

The known methods for the preparation of fluorine-containing acids are relatively few and are somewhat limited in their application. In certain instances chlorine in chlorinated acids has been replaced with fluorine by means of metallic fluorides. Heretofore, some fluorochloroolefins have been oxidized to acids and trifluoromethylbenzene derivatives have been oxidized to trifluoroacetic acid.

An object of this invention is to provide a new method of preparing fluorinated acids. A further object of this invention is to provide a new method for preparing fluorohydracrylic acids and their esters. A still further object is to provide new fluorohydracrylic acids and their esters. A specific object is to provide the new chemical compounds, alpha-fluorohydracrylic acids and their esters, and novel methods for their preparation. Other objects will appear hereinafter.

These objects are accomplished by reacting a fluorine-substituted ethylene with formaldehyde or its polymers to form a fluorinated acid. A fluoroethylene containing at least three fluorine atoms is reacted with formaldehyde, a formal or a polymer of formaldehyde under non-polymerizing conditions in the presence of a strong inorganic oxygenated acid and the resulting reaction mixture is treated with water. The new chemical products, alpha-fluorohydracrylic acids and their esters, are formed by this method.

A preferred procedure for preparing fluorohydracrylic acids and their esters is carried out by reacting a fluoroethylene containing at least three fluorine atoms with formaldehyde, a polymer thereof, or a formal under pressure in a substantially oxygen-free system in the presence of water and a strong inorganic oxygenated acid, such as concentrated sulfuric acid. The reaction is is preferably carried out by bringing the substances into contact in a reaction zone under substantially oxygen-free conditions and subjecting the substances therein to a reaction temperature. This reaction temperature is preferably between 40° to 125° C. The alpha-fluoro acid formed can be isolated from the reaction mixture by dilution with water and extraction with a water-immiscible organic solvent for the acid formed.

The new alpha-fluoro acids formed by this invention have the formula:

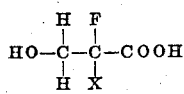

where X is a member of the class consisting of fluorine and hydrogen.

Esterification of these new alpha-fluoro acids gives new esters having the formula:

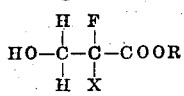

where X is a member of the class consisting of fluorine and hydrogen and R is the residual hydrocarbon radical of an alcohol after removal of the hydroxyl group. Esters in which R is an aliphatic radical having less than twelve carbon atoms are particularly preferred new chemical products.

This invention is further illustrated by the following example in which the amounts are expressed in parts by weight, unless otherwise specified.

Example 1

Fifteen parts of paraformaldehyde and 275 parts of 95% sulfuric acid are charged into a silver-lined pressure reactor having a volume 2.5 times as large as that of the above ingredients. The reactor is then closed, cooled in a mixture of Dry Ice and methanol, evacuated, and 50 parts of purified, substantially oxygen-free tetrafluoroethylene is introduced through an inlet tube. The reactor is then allowed to warm up and is heated at 80° C. for 15 hours under autogenous pressure while being shaken. After this time the reactor is cooled, the gases are bled off, and the product, fuming with hydrogen fluoride, is poured onto 375 parts of ice. After separation of a small amount of oily material and filtration, the mixture is extracted with four portions of ether (70 parts each), the ether is washed with 50 parts of water, then extracted with 180 parts of water containing 20 parts of sodium hydroxide. To the alkaline extract is added with cooling 50 parts of 50% sulfuric acid. The acidified solution is extracted with four portions of ether, 50 parts each. The ether is evaporated from the ether extract and the residue is heated at 60° C. under vacuum. This leaves a residue of 16 parts of crude, syrupy, alpha, alpha-difluorohydracrylic acid.

For purification, the acid is converted to the ethyl ester by refluxing for 10 hours with a three mole excess of absolute ethanol in the presence of anhydrous copper sulfate. The ester distills at 58–61° C./6 mm. or 181° C./760 mm., has a refractive index ($N_D^{25}$) of 1.3830 and corresponds in carbon, hydrogen and fluoride analysis to ethyl alpha, alpha-difluorohydracrylate. The hydroxyl group of the ester reacts with acetyl chloride. To recover the free acid in purified form, the ester is hydrolyzed with sodium hydroxide solution and the resulting mixture is acidified with sulfuric acid and extracted with ether. The ether and dissolved water are removed from the ether extract by warming under high vacuum, leaving a residue of very hygroscopic crystals, melting at 49–53° C., which corresponds in fluorine analysis and neutral equivalent to alpha, alpha-difluorohydracrylic acid.

When a greater proportion of paraformaldehyde is used than in the above example, for example up to three moles of formaldehyde per mole of olefin, an appreciable amount of an oily layer separates when the product is poured onto ice. This oily fraction is dissolved in the minimum amount of dilute sodium hydroxide solution and then added to the aqueous acid layer. Isolation of the product then proceeds as described in the example.

Use of trifluoroethylene in place of tetrafluoroethylene in the above example results in the formation of alpha-monofluorohydracrylic acid, which is isolated in a similar manner.

In general, it is preferred to operate between the temperature of 40° and 125° C. However, higher or lower temperatures may be employed, the low being limited to that at which reaction becomes too slow to be practical and the upper being that at which polymerization of the fluoroethylene takes place to an appreciable extent. The reaction is generally complete in 2 to 50 hours although shorter or longer time intervals can be used depending upon other reaction conditions.

The reaction is conducted under non-polymerizing conditions. Accordingly, the reaction is carried out in a substantially oxygen-free system since oxygen promotes the polymerization of the fluoroethylenes. In general, fluoroethylenes containing less than 50 parts per million of oxygen are suitable for use in this invention.

The reaction can be carried out in a bomb under autogenous pressure, or the fluoroethylene can be passed under pressure into the mixture of formaldehyde and sulfuric acid catalyst. The reaction may be further adapted to a continuous process rather than a batch process by introducing a slurry of paraformaldehyde and sulfuric acid and the fluoroethylene under pressure in a tubular reactor in a continuous manner.

Strong inorganic oxygenated acids, such as phosphoric, chlorosulfonic, or sulfuric acid may be used to promote the reaction. Because of its effectiveness, low cost and availability, the preferred acid is sulfuric acid of 80 to 100% concentration. It is desirable to use from 2 to 4 moles of sulfuric acid per mole of fluoroethylene.

In the preparaton of alpha-fluorohydracrylic acids, it is necessary to introduce water at some stage of the reaction. It is preferable to use at least two moles of water per mole of formaldehyde in order to obtain maximum yields of the alpha-fluorohydracrylic acid. Part or all of the water, but preferably not more than two to three moles per mole of formaldehyde, can be added along with the acid catalyst, as shown in Example I. If a system containing formaldehyde, fluoroethylene, catalyst and less than two moles of water per mole of formaldehyde is used during the first part of the reaction, the remainder of the water can be supplied by adding the reaction mixture to water. The amount of water present at this stage is limited only by the practical problems presented in isolating the alpha-fluorohydracrylic acids from the reaction mixture.

Fluorinated ethylenes which come within the scope of this invention are trifluoroethylene and tetrafluoroethylene.

The source of formaldehyde used can be formaldehyde itself, a solution of formaldehyde, a polymer of formaldehyde such as paraformaldehyde or trioxane, or a formal such as dimethyl formal or diethyl formal. It is preferred to use from one to three moles of formaldehyde or its equivalent per mole of fluoroethylene.

When a formal is used, the alpha-fluorohydracrylic acid is converted, in part at least, to the ester corresponding to the alcohol derived from the formal. Esters of the fluoro acid can be obtained by carrying the reaction out in the presence of an alcohol. The reaction mixture also can be heated wtih an alcohol to form the ester of the fluoro acid present. Alcohols such as methanol, ethanol, butanol, benzyl alcohol, decanol, allyl alcohol, glycerol and isopropanol react with alpha-fluorohydracrylic acids to form the corresponding esters. Esters from monohydric aliphatic alcohols having less than 12 carbon atoms are preferred since they are more readily prepared.

In the preparation of esters it is desirable to use from one to five moles of alcohol per mole of fluorohydracrylic acid but smaller or larger quantities can be employed. The ester can be isolated by distillation or by pouring the esterification mixture onto ice and separation of the water-insoluble layer.

The fluorine-substituted hydracrylic acids of the present invention can be used for the preparation of polymeric esters. Salts of the acids are useful as fungicides and rodenticides. Alpha-fluorohydracrylic acid and its esters, derived from trifluoroethylene, can be used as intermediates to obtain alpha-fluoroacrylic acid derivatives, which can be polymerized.

As many apparently widely different embodiments of this invention may be made without departing from the spirit and scope thereof, it is to be understood that I do not limit myself to the specific embodiments thereof except as defined in the appended claims.

I claim:

1. An acid having the formula:

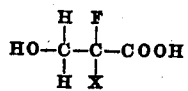

where X is a member of the class consisting of fluorine and hydrogen.

2. An ester having the formula:

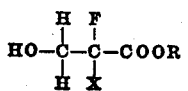

where X is a member of the class consisting of fluorine and hydrogen and R is an aliphatic hydrocarbon radical containing less than 12 carbon atoms.

3. A chemical compound having the formula

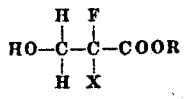

where X is a member of the class consisting of fluorine and hydrogen and R is a member of the class consisting of hydrogen and aliphatic hydrocarbon radicals having less than twelve carbon atoms.

4. The chemical compound alpha-monofluorohydracrylic acid.

5. The chemical compound alpha, alpha-difluorohydracrylic acid.

6. The chemical compound ethyl alpha, alpha-difluorohydracrylate.

MAYNARD S. RAASCH.

REFERENCES CITED

The following references are of record in the file of this patent:

UNITED STATES PATENTS

| Number | Name | Date |
|---|---|---|
| 2,257,021 | Pollack | Sept. 23, 1941 |
| 2,379,104 | Roberts | June 26, 1945 |

FOREIGN PATENTS

| Number | Country | Date |
|---|---|---|
| 514,619 | Great Britain | Nov. 14, 1939 |

OTHER REFERENCES

Bockemuller, "Annalen de Chemie," vol. 506, (1933), pages 47, 57.